United States Patent
Chu et al.

(10) Patent No.: US 9,014,744 B2
(45) Date of Patent: Apr. 21, 2015

(54) METHOD AND APPARATUS FOR REDUCING POWER CONSUMPTION IN A WIRELESS COMMUNICATION DEVICE

(75) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 413 days.

(21) Appl. No.: 12/927,932

(22) Filed: Nov. 30, 2010

(65) Prior Publication Data

US 2012/0135776 A1 May 31, 2012

(51) Int. Cl.
*H04B 7/00* (2006.01)
*H04W 52/02* (2009.01)

(52) U.S. Cl.
CPC ............ *H04W 52/0238* (2013.01); *Y02B 60/50* (2013.01)

(58) Field of Classification Search
CPC ..... H04W 28/04; H04W 84/12; H04W 16/10; H04W 24/10; H04W 28/06; H04W 28/22; H04W 52/0209; H04W 72/02; H04L 1/003; H04L 27/2602; H04L 1/0006; H04L 1/0072; H04L 1/0075; H04L 5/0007; H04L 5/0048; H04L 5/0053; H04L 5/0058; H04B 17/0042; H04B 17/0077; H04B 7/02; H04B 7/0669
USPC .......... 455/522, 69, 574, 127.1, 127.5, 343.1, 455/75, 186.1, 343.2, 426.2, 445, 450; 370/328, 318, 203, 210, 252, 310–312, 370/329, 338, 344; 375/260, 267, 295, 341
See application file for complete search history.

(56) References Cited

U.S. PATENT DOCUMENTS

| 2006/0280134 A1* | 12/2006 | Kwon et al. | 370/278 |
| 2010/0309834 A1* | 12/2010 | Fischer et al. | 370/312 |
| 2011/0090844 A1* | 4/2011 | Gong et al. | 370/328 |
| 2011/0305176 A1* | 12/2011 | Wentink | 370/310 |

* cited by examiner

*Primary Examiner* — Golam Sorowar
(74) *Attorney, Agent, or Firm* — Seed IP Law Group PLLC

(57) ABSTRACT

A method and apparatus for conserving power in a wireless communication device. The method includes receiving at least a portion of a PHY protocol data unit (PPDU) frame, where the PPDU frame includes an aggregate MAC protocol data unit (A-MPDU) field. The method also includes comparing a receiver address (RA) within the A-MPDU field to a stored address of the wireless communication device and, if the received RA does not match the stored address, causing power to be removed from one or more circuits of the wireless communication device for a calculated period of time.

21 Claims, 3 Drawing Sheets

METHOD AND APPARATUS FOR REDUCING POWER CONSUMPTION IN A WIRELESS COMMUNICATION DEVICE

TECHNICAL FIELD

The present disclosure is directed, in general, to wireless communication devices, and more specifically, to a method and apparatus for reducing power consumption in a wireless communication device.

BACKGROUND

A portable wireless communication device is often powered by a battery or other portable power supply. It is desirable for the wireless communication device to operate for as long a period of time as possible before exhausting the portable power supply and requiring recharging or replacement of the portable power supply.

A fixed wireless communication device may be powered from the power grid, but a designer of such a device may still seek to minimize power requirements of the device. Such reductions may reduce operating costs of an owner of the device or reduce the impact of the device on capacity of the power grid.

SUMMARY

A method of reducing power consumption in a wireless communication device includes receiving at least a portion of a PHY protocol data unit (PPDU) frame, where the PPDU frame includes an aggregate MAC protocol data unit (A-MPDU) field. The method also includes comparing a receiver address (RA) within the A-MPDU field to a stored address of the wireless communication device. The method further includes causing power to be removed from one or, more circuits of the wireless communication device for a calculated period of time, upon determining that the received RA does not match the stored address of the wireless communication device.

A wireless communication device includes a receiver and a controller. The controller is coupled to the receiver and configured to receive via the receiver at least a portion of a PHY protocol data unit (PPDU) frame, where the PPDU frame includes an aggregate MAC protocol data unit (A-MPDU) field. The controller is further configured to compare a receiver address (RA) within the A-MPDU field to a stored address of the wireless communication device. The controller is still further configured cause power to be removed from one or more circuits of the wireless communication device for a calculated period of time, upon determining that the received RA does not match the stored address of the wireless communication device.

A tangible computer-readable storage medium is encoded with computer-executable instructions that, when executed, cause a controller of a wireless communication device to receive at least a portion of a PHY protocol data unit (PPDU) frame, where the PPDU frame includes an aggregate MAC protocol data unit (A-MPDU) field. The instructions further cause the controller to compare a receiver address (RA) within the A-MPDU field to a stored address of the wireless communication device. The instructions still further cause the controller to cause power to be removed from one or more circuits of the wireless communication device for a calculated period of time, upon determining that the received RA does not match the stored address of the wireless communication device.

Other technical features may be readily apparent to one skilled in the art from the following figures, descriptions and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

This disclosure describes a wireless communication device configured to receive an A-MPDU PPDU frame up to a point in time at which the wireless communication device can recognize that the receiver address (RA) in an MPDU of the PPDU frame does not match the address of the wireless communication device. In response to such recognition, the wireless communication device stops receiving signals and/or removes power from circuits of the wireless communication device until the PPDU frame is completed. The wireless communication device then resumes receiving signals and/or reapplies power to one or more of the circuits of the wireless communication device. One result of the disclosed steps is that the wireless communication device according to the disclosure conserves power during the transmission of data not intended for the wireless communication device.

The Institute for Electrical and Electronics Engineers (IEEE) has developed a set of wireless communication standards referred to as "IEEE 802.11". The 802.11 standards are actually a family of standards. For example, the original version of the standard IEEE 802.11 (commonly denoted as "802.11") was followed by amendments that are indicated by names that include "802.11a", "802.11b", "802.11g", "802.11n" and "802.11ac".

The 802.11n standard added elements to the previous standards that established a High Throughput (HT) mode for communicating data at a higher data rate. The 802.11ac standard added further elements for even higher data rates using a Very High Throughput (VHT) mode.

Figure 1:
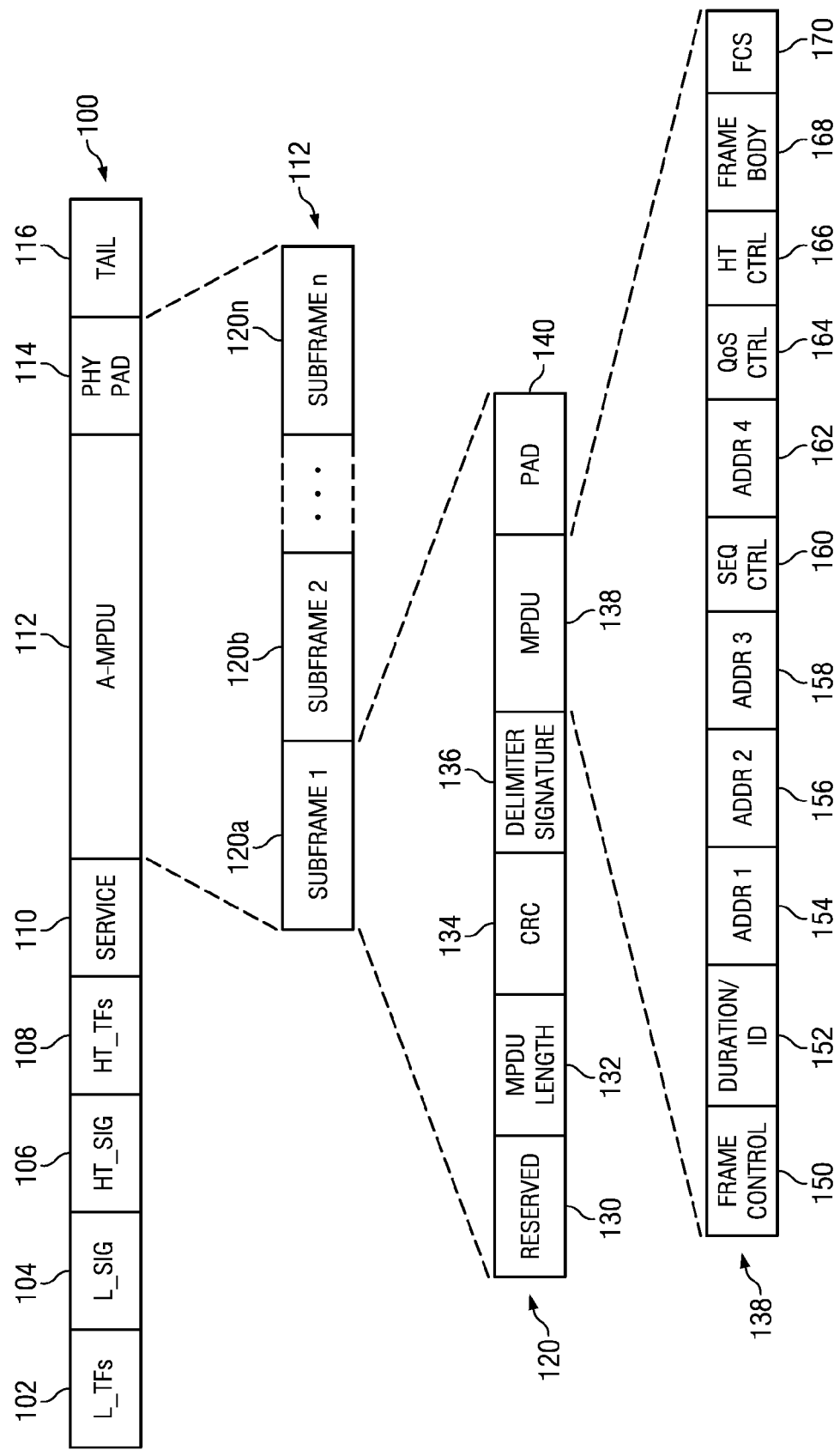
FIG. 1 illustrates a PHY-layer protocol data unit according to the IEEE 802.11n specification reference.

FIG. 1 illustrates a PHY-layer protocol data unit (PPDU) frame 100 according to the IEEE 802.11n standard. The PPDU frame 100 includes legacy training fields (L_TFs) 102, a legacy signature (L_SIG) field 104, a high throughput signature (HT_SIG) field 106, high throughput training fields (HT_TFs) 108, and an aggregate MAC protocol data unit (A-MPDU) field 110. The fields LTFs 102 and L_SIG 104 are so-called "legacy" fields established by the 802.11 standard, while the fields HT_SIG 106, HT_TFs 108 and A-MPDU 110 are part of the high throughput improvements established in the 802.11n standard.

The duration of the PPDU frame 100 is measured from the beginning of the HT_SIG field 106 through the end of the A-MPDU field 110. Under the 802.11n standard, the HT_SIG field 106 comprises information relating to a length and a rate for the PPDU 100 frame.

An A-MPDU field may include two or more A-MPDU subframes. The A-MPDU field 110 includes N A-MPDU subframes, indicated in FIG. 1 as 120a, 120b through 120n. Each A-MPDU subframe 120 includes at least a reserved field 130, an MPDU length field 132, a cyclic redundancy check (CRC) field 134, a delimiter signature field 136, and an MPDU field 138. All A-MPDU subframes except the final A-MPDU subframe 120n may also include a pad field 140 to cause each padded A-MPDU subframe to have a length that is a multiple of 4 octets. The fields 130, 132, 134 and 136 comprise an MPDU delimiter.

The MPDU field 138 includes a frame control field 150, a duration/ID field 152, an address 1 field 154, an address 2 field 156, and address 3 field 158, a sequence control field 160, and address 4 field 162, a quality of service (QoS) control field 164, a high throughput (HT) control field 166, a frame body 168, and a frame check sequence (FCS) field 170. The duration/ID fields 152 in all MPDUs in an A-MPDU carry the same value. In this way a station can update its NAV timer if at least one valid MPDU frame is received.

The address 1 field 154 contains the receiver address (RA); that is, the address of the station to which the data in the MPDU is being sent. All MPDUs in an A-MPDU are sent to a single station and, thus, all MPDUs in the A_MPDU contain the same RA in the address 1 field 154. The receiving station performs a NAV update operation when the PHY-RXEND-.indication primitive is received at the end of PPDU reception.

Figure 2:
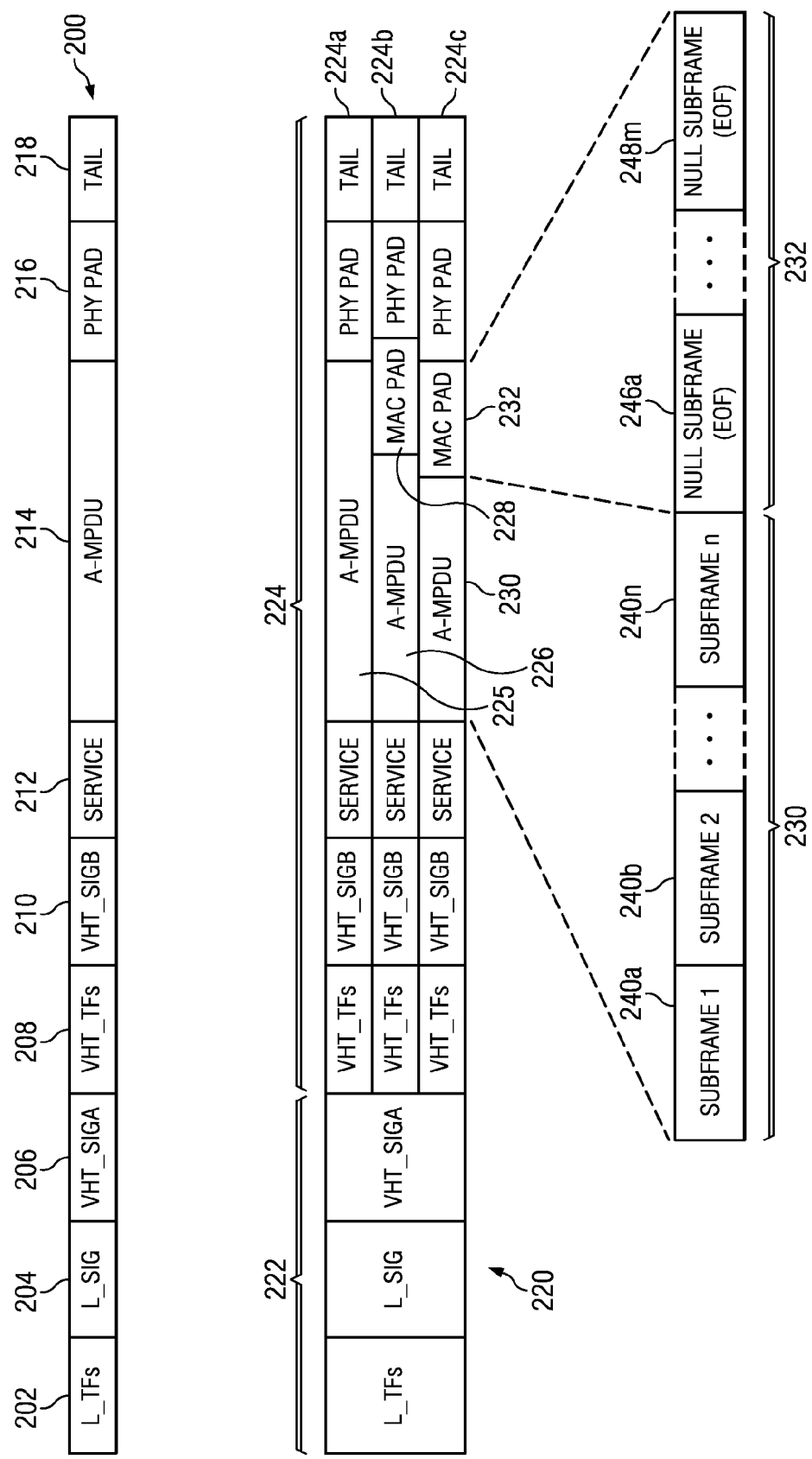
FIG. 2 illustrates a PHY-layer protocol data unit according to the IEEE 802.11ac specification reference.

FIG. 2 illustrates a PPDU frame 200 according to the IEEE 802.11ac standard. The PPDU frame 200 includes legacy training fields (L_TFs) 202, a legacy signature (L_SIG) field 204, a first very high throughput (VHT) signature field (VHT_SIGA) 206, very high throughput training fields (VHT_TFs) 208, a second VHT signature field (VHT_SIGB) 210, a service field 212, an A-MPDU field 214, a PHY-layer pad field 216, and a tail field 218. The fields VHT_SIGA 206, VHT_TFs 208, VHT_SIGB 210, service 212; A-MPDU 214, PHY pad 216, and tail 218 are part of the very high throughput improvements established in the 802.11ac standard.

The duration of the PPDU frame 200 is measured from the beginning of the VHT_SIGA field 206 through the end of the tail field 218. Under the 802.11ac standard, the L_SIG field 204 comprises information relating to a length and a rate for the PPDU 200 frame.

The 802.11ac standard establishes a format for simultaneous communication by a single access point (or base station) to a plurality of receiving stations using techniques of beam forming. Stations operating under the 802.11n and earlier standards employed antennas that radiated and received signals omnidirectionally or in a single spatially shaped beam (a so-called "beam formed" beam). Under the 802.11ac standard, antenna arrays may be employed to spatially shape two or more beams simultaneously. An 802.11ac access point or base station may "aim" a first beam in a first direction toward a first receiving station, while simultaneously aiming a second beam in a second direction toward a second receiving station. Because the beams have a narrow angular dispersion, the signal transmitted to the first station does not cause radio frequency interference with the signal transmitted to the second station. Beam forming may be used to communicate with two, three, four, or more stations simultaneously using a like number of beams transmitted from one or more antenna arrays.

The 802.11ac standard establishes a second form of PPDU frame 220, also illustrated in FIG. 2. The PPDU frame 220 includes a first portion 222 that comprises the fields L_TFs, L_SIG, and VHT_SIGA, as described with reference to the PPDU frame 200. The first portion 222 is transmitted omnidirectionally by the antenna array of an access point. The PPDU frame 220 also comprises a second portion 224, which in turn comprises three subportions 224a, 224b and 224c. Each of the subportions 224a, 224b and 224c is transmitted in a different beam to a different receiving station. The subportions 224a, 224b and 224c may be referred to as "per-user streams." Each subportion includes the fields VHT_TFs, VHT_SIGB, service, PHY pad, and tail, as described with reference to the PPDU frame 200. Each subportion also includes an A-MPDU field that may be different than the A-MPDU field described with reference to the PPDU frame 200, as described below. There is no per-user length indication in the preamble of the PPDU frame 220.

The A-MPDU fields in the PPDU frame 220 may be as described with reference to the PPDU frame 200, as shown in the subportion 224a. However, where the A-MPDUs sent to different receiving stations are of differing lengths, the 802.11ac specification framework establishes a technique of padding shorter A-MPDUs to equal the length of a longest A-MPDU in a group of A-MPDUs to be sent in a single PPDU frame.

In the PPDU frame 220, an A-MPDU field 225 in the subportion 224a is the longest A-MPDU. An A-MPDU field 226 in the subportion 224b is shorter than the A-MPDU field 225. The A-MPDU field 226 is followed by a MAC pad field 228. Similarly, an A-MPDU field 230 in the subportion 224c is shorter than the A-MPDU field 225. The A-MPDU field 230 is followed by a MAC pad field 232. Lengths of the PHY pad fields in each of subportions 224a, 224b and 224c are selected so that the PHY pad field end at substantially the same time.

As described with reference to the A-MPDU field 110 of FIG. 1, the A_MPDU field 230 includes N A-MPDU subframes, indicated in FIG. 2 as 240a, 240b through 240n. The A-MPDU fields 225 and 226 similarly each include a plurality of subframes. The subframes of the A-MPDU fields 225, 226 and 230 in turn include fields (including an MPDU) as described with reference to the subframe 120 of FIG. 1. The MAC pad field 232 includes M null subframes, indicated in FIG. 2 as 246a through 246m.

The null subframes 246a through 246m may include an end-of-frame (EOF) flag. When the MAC layer of a receiving station detects the EOF flag, it may conserve power by signaling the PHY layer of the station to stop receiving until the end of the PPDU frame 220. The PHY layer uses the duration and rate information received in the L_SIG field of the portion 222 of the PPDU frame 220 to calculate a period of time remaining in the PPDU frame. The PHY layer waits this calculated period of time before resuming the reception of signal.

Each of the A-MPDU fields 225, 226 and 230 is sent to a different receiving address (RA); that is, there is at most one A-MPDU to an RA in the second portion 224 of the PPDU frame 220. As described with reference to the A-MPDU field 110 of FIG. 1, at least two rules from the 802.11n standard are carried over to the A-MPDUs of the PPDU frame 220. All MPDUs within an A-MPDU field are sent to a single station and, thus, all MPDUs in an A-MPDU field contain the same RA. The duration/ID fields in all MPDUs in an A-MPDU carry the same value.

As established in the 802.11ac standard a maximum allowable length of a VHT PPDU is 1,048,576 octets. As established in the original 802.11ac specification framework, a maximum allowable length of an MPDU is 11,454 octets. Therefore, an A-MPDU may include, at most, 91 MPDUs of maximal length. This is established by the calculation:

$$1,048,576/(11,454+4)\approx 91,$$

where 4 represents a length of an A-MPDU delimiter field. A maximum duration for the A-MPDU in a VHT PPDU is limited by a maximum number of symbols that may be indicated by the length information in the L_SIG field 204 of a VHT PPDU frame, which is 1365*4 microsecond, or 5.46 milliseconds.

Figure 3:
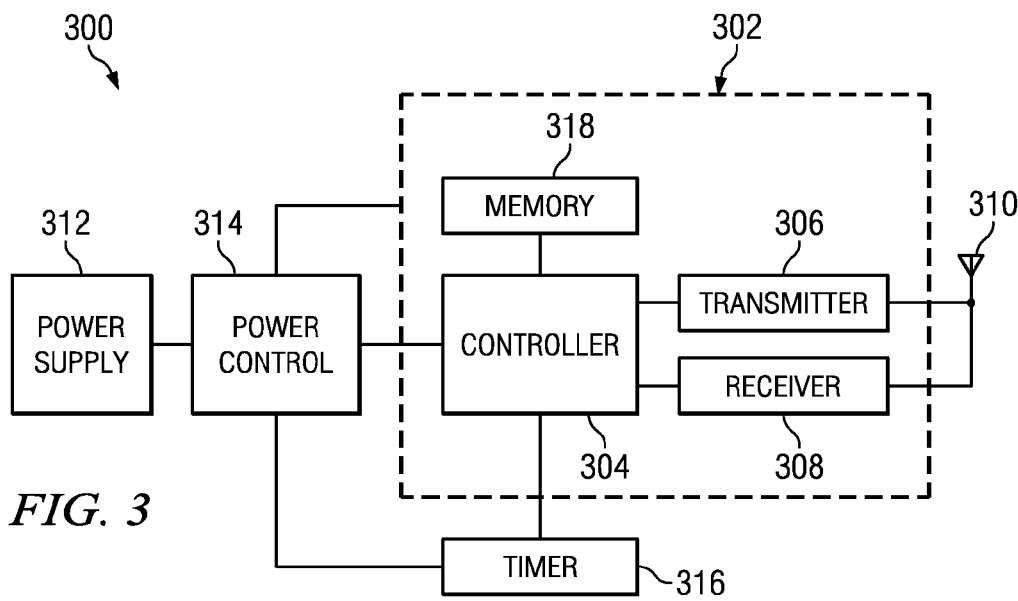
FIG. 3 illustrates a wireless communication device according to an embodiment of the present disclosure.

FIG. 3 illustrates a wireless communication device 300 according to an embodiment of the present disclosure. The wireless communication device 300 may be an access point, a base station, or a leaf node station. The wireless communication device may operate under either or both of the 802.11n and 802.11ac standards. The wireless communication device 300 may be a fixed, mobile, or portable device.

The wireless communication device 300 includes a core section 302, which includes a controller 304 coupled to a memory 318, a transmitter 306 and a receiver 308. It will be understood that the core section 302 may include other circuitry not shown in FIG. 3. The transmitter 306 and the receiver 308 may be separate circuits, as shown in FIG. 3, or may be a single transceiver circuit. The controller 304 may be any suitable processing device, such as a microprocessor, microcontroller, programmable gate array (PGA), application-specific integrated circuit (ASIC), or the like. The memory 318 includes any suitable volatile and/or non-volatile storage and retrieval device or devices. The memory 318 may include a combination of such memory types. The memory 318 may store data and instructions adapted to be used by the controller 304 to direct the circuits of the wireless communication device 300 to operate according to the methods of this disclosure.

The transmitter 306 and the receiver 308 are coupled to an antenna 310. The antenna 310 may be an omnidirectional or directional antenna. The antenna 310 may be a single antenna or a plurality of antennas, used for transmission and reception together or separately. Where the wireless communication device 300 is a base station or access point operating under the 802.11ac standard, the antenna 310 may be an antenna array or other multipart antenna configurable to operate omnidirectionally or with a plurality of formed beams for transmission and/or reception.

The controller exchanges control signals with the transmitter 306 and provides data for transmission by the transmitter 306 via the antenna 310. The controller exchanges control signals with the receiver 308 and receives data received by the receiver 308 via the antenna 310.

The wireless communication device 300 further includes a power supply 312 coupled to the circuits of the core section 302, at least in part, via a power control circuit 314. The power supply 312 may also supply power to other circuits of the core section 302 and the wireless communication device 300 separately from the power control circuit 314. The power supply 312 may be a battery or other power storage device or may be an AC/DC converter or other device powered by an external power source, such as the AC power grid. The power control circuit 314 is configured to apply or remove power to/from some or all circuits of the core section 302. By removing power from some or all circuits of the core section 302, the power control circuit may reduce an amount of power drawn from the power supply 312, which may in turn reduce an amount of power drawn by the power supply 312 from an external power source or reduce a rate at which power stored in the power supply 312 is used.

Circuits that may have power removed to reduce power consumption may include some or all of the receiver 308, the controller 304, the memory 318, and the transmitter 306. That is, to reduce power consumption of the core section 302, circuits associated with receiving signals may be powered off, along with other circuits.

The power control circuit 314 may be coupled to and controlled by the controller 304, which is configured to cause the power control circuit 314 to apply power to or remove power from any circuit that receives power via the power control circuit 314. The controller 304 is further configured to cause the power control circuit to remove power from the controller 304 itself.

The power control circuit 314 is further configured to receive control signals from other circuits, such as a timer 316. The power control circuit may be preset to apply power to selected circuits of the core section 302 and/or other circuits of the wireless communication device 300, in response to such signals from other circuits. The controller 304 is coupled to and exchanges control signals with the timer 316. The controller 304 is configured to preset the timer 316 to a desired time period and to start the timer 316. The timer is configured to send a control signal to either or both of the controller 304 and the power control circuit 314 when the preset time period expires.

While the power control circuit 314 and the timer 316 are shown in FIG. 3 as individual circuits, it will be understood that in other embodiments the power control circuit 314, the timer 316, and the core section 302 may comprise a single circuit.

Figure 4:
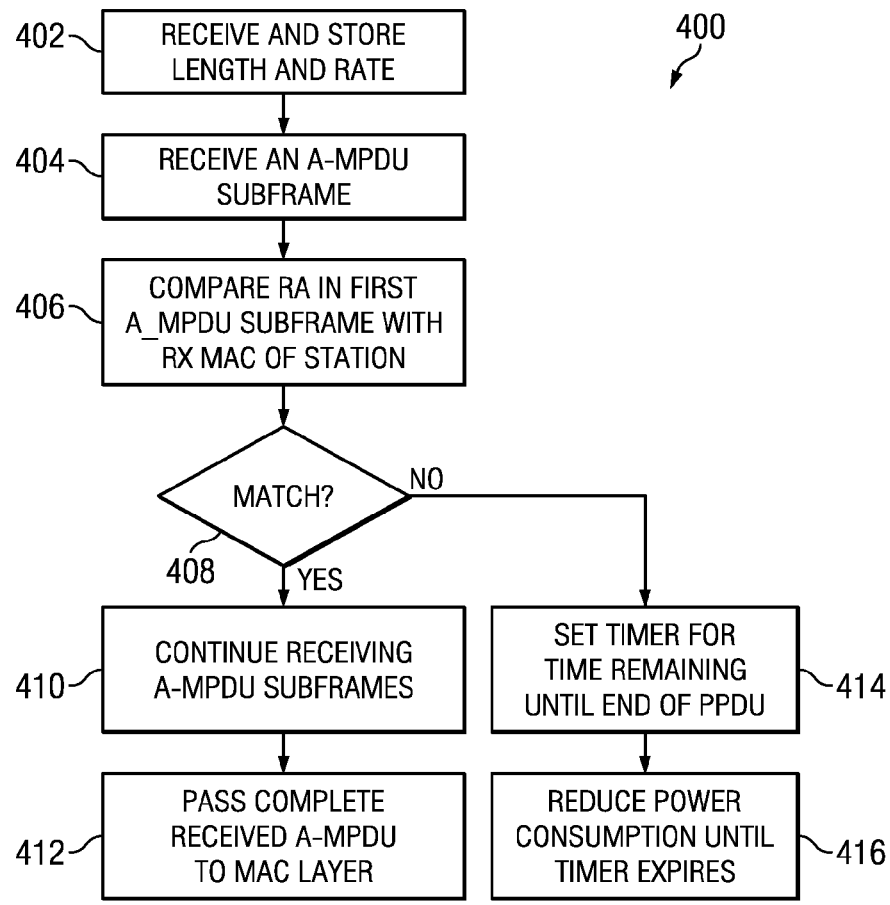
FIG. 4 illustrates a process of receiving a PHY-layer protocol data unit according to an embodiment of the present disclosure.

FIG. 4 illustrates a process 400 of receiving a PHY-layer protocol data unit according to an embodiment of the present disclosure. In general, a wireless communication device according to the disclosure receives an A-MPDU PPDU frame up to a point in time at which the wireless communication device can recognize that the receiver address (RA) in an MPDU of the PPDU frame does not match the address of the wireless communication device. In response to such recognition, the wireless communication device stops receiving signals and/or removes power from circuits of the wireless communication device until the PPDU frame is completed. The wireless communication device then resumes receiving signals and/or reapplies power to one or more of the circuits of the wireless communication device. One result of the disclosed steps is that the wireless communication device according to the disclosure conserves power during the transmission of data not intended for the wireless communication device.

For ease of explanation, the process 400 of FIG. 4 is described with respect to the wireless communication device 300 of FIG. 3 and the PPDU frames of FIGS. 1 and 2. The process 400 may be used by any other suitable wireless communication device.

While the wireless deice 300 is receiving a PPDU frame such as PPDU frame 100 of FIG. 1 or PPDU frames 200 or 220 of FIG. 2, in step 402 the wireless communication device 300 receives information relating to a length (or duration) of the PPDU frame and a rate at which the PPDU frame is being sent. Where the wireless communication device 300 is receiving a PPDU frame according to the 802.11n standard, the information relating to the length and the rate is received in the HT_SIG field. Where the wireless communication device 300 is receiving a PPDU frame according to the 802.11ac specification framework, the information relating to the length and the rate is received in the L_SIG field. The wireless communication device 300 also stores the received length and rate information in memory 318 in step 402.

In step 404, the wireless communication device 300 receives an A-MPDU subframe of the PPDU frame. In some embodiments, the A-MPDU subframe received in step 404 is a first A-MPDU subframe of the PPDU frame. In other embodiments, the A-MPDU subframe received in step 404 is a second or subsequent A-MPDU subframe of the PPDU frame. In step 406, the controller 304 compares a receiver address (RA) within the received A-MPDU subframe with an RX MAC or other stored representation of the receiver address of the wireless communication device 300.

If the received RA and the RX MAC match, in step 408 the process 400 proceeds to step 410. If the received RA and the RX MAC do not match, in step 408 the process 400 proceeds to step 414. In step 410, the wireless communication device 300 has determined that it is the intended recipient of the A-MPDU and continues receiving any remaining A-MPDU subframes. Once all A-MPDU subframes have been successfully received, in step 412, the complete received A-MPDU is passed from the PHY layer to the MAC layer for further processing.

In step 414, the wireless communication device has determined that it is not the intended recipient of the A-MPDU. Using the length and rate information received in step 402, as well as information relating to an amount of time elapsed since beginning to receive the PPDU, in step 414 the controller 304 calculates an amount of time remaining in the PPDU being received and sets the timer 316 for the calculated amount of time.

The timer 316 may be passed the length and rate information received in step 402 and the information relating to an amount of time elapsed since beginning to receive the PPDU and calculate a an amount of time remaining in the PPDU being received. The timer 316 may then set itself to the calculated amount of time. The timer 316 may be set for an amount of time that accommodates a power up sequence of the circuits powered down by the timer control circuit 314, such that the powered-down circuits are operational within a desired period before or after the end of the PPDU.

In step 416, the controller 304 takes one or more actions to reduce power consumption until the timer 316 expires and signals the completion of the time period set in step 414. The signal from the timer 316 may be a "time complete" signal sent to one or both of the controller 304 and the power control circuit 314. The controller may signal the receiver 308 to stop receiving signals. The controller may instruct the power control circuit 314 on actions to take upon the time complete signal from the timer 316. The controller may instruct the power control circuit 314 to remove power from some or all of the circuits of the core section 302. If the controller 304 is receiving power and operating when the timer 316 sends the "time complete" signal, the controller 304 may instruct the power control circuit 314 to restore power to some or all of the circuits of the core section 302. If the controller 304 is not operating when the timer 316 sends the "time complete" signal, the power control circuit may restore power to some or all of the circuits of the core section 302, as previously instructed by the controller 304 or by internal instructions stored within the power control circuit 314.

When the controller 304 receives the "time complete" signal from the timer 316 it will execute a NAV update algorithm with the length and rate information received in the HT_SIG field (802.11n) or L_SIG field (802.11ac).

While the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), as well as user-recordable type mediums such as floppy disks, hard disk drives, compact disk read only memories (CD-ROMs), and digital versatile disks (DVDs).

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A method of reducing power consumption performed in a wireless communication device, the method comprising:

receiving, in a controller of the wireless communication device, at least a portion of a physical (PHY) layer protocol data unit (PPDU) frame, the PPDU frame comprising an aggregate media access control (MAC) protocol data unit (A-MPDU) field;

comparing, in the controller of the wireless communication device, a receiver address (RA) within the A-MPDU field to a stored address of the wireless communication device; and upon determining that the received RA does not match the stored address of the wireless communication device, causing, with the controller, power to be removed from one or more circuits of the wireless communication device for a calculated period of time by calculating an amount of time remaining until an end of the PPDU frame according to information relating to data length and data rate of the PPDU frame, wherein the controller is configured to determine the information relating to data length and data rate from a legacy signature field of the received portion of the PPDU frame when the PPDU frame is in accordance with a first standard, the legacy signature field comprising information relating to a data length and a data rate for the PPDU frame, and is configured to determine the information relating to data length and data rate from a high throughput signature field of the received portion of the PPDU frame when the PPDU frame is in accordance with a second standard, the high throughput signature field comprising information relating to a data length and a data rate for the PPDU frame, depending upon a structure of the PPDU frame, wherein the data length is an amount of data carried by the PPDU frame and the data rate is a number of bits per second, and calculating, by the controller, the calculated period of time according to the amount of time remaining until the end of the PPDU frame.

2. The method of claim 1, wherein the information relating to data length and data rate is determined from the legacy signature field when the PPDU frame is in accordance with an IEEE 802.11ac standard and is determined from the high throughput signature field when the PPDU frame is in accordance with an IEEE 802.11n standard.

3. The method of claim 2, wherein the amount of time remaining until the end of the PPDU frame is also calculated based upon time elapsed since a start of the at least a portion of the PPDU frame.

4. The method of claim 1, wherein the controller signals completion of the calculated period of time.

5. The method of claim 4, wherein causing power to be removed from the one or more circuits of the wireless communication device comprises stopping the receiver from receiving signals during the calculated period of time.

6. The method of claim 4, wherein causing power to be removed from one or more circuits of the wireless communication device comprises causing a power control circuit to remove power from the one or more circuits of the wireless communication device during the calculated period of time.

7. The method of claim 6, further comprising restoring power to some or all of the one or more circuits of the wireless communication device in response to completion of the calculated period of time.

8. A wireless communication device, comprising:
a receiver; and
a controller coupled to the receiver, wherein the controller is configured to:
receive at least a portion of a physical (PHY) layer protocol data unit (PPDU) frame, the PPDU frame comprising an aggregate media access control (MAC) protocol data unit (A-MPDU) field;
compare a receiver address (RA) within the A-MPDU field to a stored address of the wireless communication device; and
upon determining that the received RA does not match the stored address of the wireless communication device, cause power to be removed from one or more circuits of the wireless communication device for a calculated period of time by
calculating an amount of time remaining until an end of the PPDU frame according to information relating to data length and data rate of the PPDU frame, wherein controller is configured to determine the information relating to data length and data rate from a legacy signature field of the received portion of the PPDU frame when the PPDU frame is in accordance with a first standard, the legacy signature field comprising information relating to a data length and a data rate for the PPDU frame, and is configured to determine the information relating to data length and data rate from a high throughput signature field of the received portion of the PPDU frame when the PPDU frame is in accordance with a second standard, the high throughput signature field comprising information relating to a data length and a data rate for the PPDU frame, depending upon a structure of the PPDU frame, wherein the data length is an amount of data carried by the PPDU frame and the data rate is a number of bits per second, and calculating the calculated period of time according to the amount of time remaining until the end of the PPDU frame.

9. The wireless communication device of claim 8, wherein the information relating to data length and data rate is determined from the legacy signature field when the PPDU frame is in accordance with an IEEE 802.11ac standard and is determined from the high throughput signature field when the PPDU frame is in accordance with an IEEE 802.11n standard.

10. The wireless communication device of claim 8, wherein the amount of time remaining until the end of the PPDU frame is also calculated based upon time elapsed since a start of the at least a portion of the PPDU frame.

11. The wireless communication device of claim 8, wherein the controller is further configured to signal completion of the calculated period of time.

12. The wireless communication device of claim 11, wherein the controller is further configured to stop the receiver from receiving signals during the calculated period of time.

13. The wireless communication device of claim 11, wherein the controller is further configured to cause a power control circuit to remove power from the one or more circuits of the wireless communication device during the calculated period of time.

14. The wireless communication device of claim 13, wherein the controller is further configured to restore power to some or all of the one or more circuits of the wireless communication device in response to completion of the calculated period of time.

15. A non-transitory tangible computer-readable storage medium encoded with computer-executable instructions that, when executed, cause a controller of a wireless communication device to:
receive at least a portion of a physical (PHY) layer protocol data unit (PPDU) frame, the PPDU frame comprising an aggregate media access control (MAC) protocol data unit (A-MPDU) field;
compare a receiver address (RA) within the A-MPDU field to a stored address of the wireless communication device;
upon determining that the received RA does not match the stored address of the wireless communication device, cause power to be removed from one or more circuits of the wireless communication device for a calculated period of time by
calculating an amount of time remaining until an end of the PPDU frame according to information relating to data length and data rate of the PPDU frame, wherein the information relating to data length and data rate is determined from a legacy signature field of the received portion of the PPDU frame when the PPDU frame is in accordance with a first standard, the legacy signature field comprising information relating to a data length and a data rate for the PPDU frame, and the information relating to data length and data rate is determined from a high throughput signature field of the received portion of the PPDU frame when the PPDU frame is in accordance with a second standard, the high throughput signature field comprising information relating to a data length and a data rate for the PPDU frame, depending upon a structure of the PPDU frame, wherein the data length is an amount of data carried by the PPDU frame and the data rate is a number of bits per second, and calculating the calculated period of time according to the amount of time remaining until the end of the PPDU frame.

16. The computer-readable storage medium of claim 15, wherein the information relating to data length and data rate is determined from the legacy signature field when the PPDU frame is in accordance with an IEEE 802.11ac standard and is determined from the high throughput signature field when the PPDU frame is in accordance with an IEEE 802.11n standard.

17. The computer-readable storage medium of claim 16, wherein the amount of time remaining until the end of the PPDU frame is also calculated based upon time elapsed since a start of the at least a portion of the PPDU frame.

18. The non-transitory computer-readable storage medium of claim 15, further encoded with computer-executable instructions that, when executed, cause the controller to signal completion of the calculated period of time.

19. The non-transitory computer-readable storage medium of claim 18, further encoded with computer-executable instructions that, when executed, cause the controller to stop the receiver from receiving signals during the calculated period of time.

20. The non-transitory computer-readable storage medium of claim 18, further encoded with computer-executable instructions that, when executed, cause the controller to cause a power control circuit to remove power from one or more circuits of the wireless communication device during the calculated period of time.

21. The non-transitory computer-readable storage medium of claim 20, further encoded with computer-executable instructions that, when executed, cause the controller to restore power to some or all of the one or more circuits of the wireless communication device in response to completion of the calculated period of time.

* * * * *